United States Patent
Low et al.

(10) Patent No.: US 12,422,314 B2
(45) Date of Patent: Sep. 23, 2025

(54) INPUT STRUCTURES THAT INCLUDE SLOTS THAT CREATE A STRESS CONCENTRATION REGION IN A SUBSTRATE FOR STRAIN DETECTION BY A SENSOR

(71) Applicant: Qorvo US, Inc., Greensboro, NC (US)

(72) Inventors: Bryan Low, Mountain View, CA (US); Julius Minglin Tsai, San Jose, CA (US); Ali Foughi, Atherton, CA (US)

(73) Assignee: Qorvo US, Inc., Greensboro, NC (US)

( * ) Notice: Subject to any disclaimer, the term of this patent is extended or adjusted under 35 U.S.C. 154(b) by 158 days.

(21) Appl. No.: 17/959,821

(22) Filed: Oct. 4, 2022

(65) Prior Publication Data

US 2023/0127077 A1  Apr. 27, 2023

Related U.S. Application Data

(60) Provisional application No. 63/253,658, filed on Oct. 8, 2021.

(51) Int. Cl.
*G01L 1/00* (2006.01)
*G06F 3/041* (2006.01)

(52) U.S. Cl.
CPC ............ *G01L 1/005* (2013.01); *G06F 3/0414* (2013.01)

(58) Field of Classification Search
CPC ....... G01L 1/26; G01L 1/2293; G01L 1/2287; G01L 1/2212; G01L 1/005; G01L 1/18; G01L 5/1627; G01L 5/162; B81B 3/0094; B81B 3/0097; B81B 3/0078; B81B 3/0072; B81B 3/007; G01N 2203/0286; G01N 2203/0272; G01N 2203/027; G01N 2203/0267

See application file for complete search history.

(56) References Cited

U.S. PATENT DOCUMENTS

| | | | | |
|---|---|---|---|---|
| 4,367,656 | A | * 1/1983 | Fritsch | .................. G01L 1/2206 73/862.632 |
| 4,475,409 | A | * 10/1984 | Zulliger | ................ G01L 1/2206 73/862.627 |
| 4,498,229 | A | 2/1985 | Wilner | |
| 4,836,025 | A | * 6/1989 | Mihara | .................. H10N 39/00 73/497 |

(Continued)

FOREIGN PATENT DOCUMENTS

CZ  308886 B6  8/2021

OTHER PUBLICATIONS

Extended European Search Report for European Patent Application No. 22200106.7, mailed Feb. 7, 2023, 26 pages.

(Continued)

*Primary Examiner* — Tran M. Tran
(74) *Attorney, Agent, or Firm* — Withrow & Terranova, P.L.L.C.

(57) ABSTRACT

Described herein are input structures that include an input surface and one or more sensor modules attached to the input surface. Each sensor module includes one or more sensors operably attached to a substrate. The one or more sensors are operable to detect strain on the substrate. One or more portions of the substrate are removed to produce a stress concentration region in proximity to at least one sensor. The stress concentration region concentrates strain in proximity to the at least one sensor.

20 Claims, 9 Drawing Sheets

(56) References Cited

U.S. PATENT DOCUMENTS

| | | | | |
|---|---|---|---|---|
| 4,869,107 | A * | 9/1989 | Murakami | G01P 15/123 338/46 |
| 4,951,510 | A * | 8/1990 | Holm-Kennedy | G01P 15/18 73/514.31 |
| 4,996,882 | A * | 3/1991 | Kistler | G01B 7/16 73/777 |
| 5,510,581 | A * | 4/1996 | Angel | G01L 1/2206 177/229 |
| 5,589,634 | A * | 12/1996 | Nagahara | G01P 15/18 73/514.33 |
| 5,708,207 | A * | 1/1998 | Nagahara | G01P 15/18 73/514.33 |
| 6,122,965 | A * | 9/2000 | Seidel | G01P 15/18 73/514.32 |
| 6,173,615 | B1 * | 1/2001 | Takahashi | G01L 5/1627 73/767 |
| 6,634,231 | B2 * | 10/2003 | Malametz | B81B 3/0072 73/514.01 |
| 6,634,235 | B2 * | 10/2003 | Maeda | G01B 7/20 73/862.634 |
| 6,701,260 | B1 * | 3/2004 | Rouvari | G01B 7/18 702/42 |
| 6,796,176 | B2 * | 9/2004 | Featonby | G01P 1/006 73/497 |
| 7,637,174 | B2 * | 12/2009 | Hirabayashi | G01L 1/26 73/862.041 |
| 7,707,899 | B2 * | 5/2010 | Sakurai | G01L 1/2281 73/764 |
| 7,903,090 | B2 * | 3/2011 | Soss | G06F 3/04142 345/184 |
| 7,930,946 | B2 * | 4/2011 | Jager | G01L 1/18 73/862.045 |
| 7,997,155 | B2 * | 8/2011 | Maeda | G01B 7/18 73/862.627 |
| 8,186,232 | B2 * | 5/2012 | McDearmon | G01B 7/16 73/862.632 |
| 8,250,934 | B2 * | 8/2012 | Sakurai | G01P 15/18 73/862.041 |
| 8,418,558 | B2 * | 4/2013 | Kazama | G01P 15/18 73/514.33 |
| 8,474,332 | B2 * | 7/2013 | Bente, IV | A61M 5/14248 73/862.53 |
| 8,502,224 | B2 * | 8/2013 | Tain | G01L 1/2206 257/621 |
| 8,607,646 | B2 * | 12/2013 | Ohsato | G01P 15/123 73/862.044 |
| 8,733,176 | B2 * | 5/2014 | Li | B81B 3/0086 73/715 |
| 8,813,347 | B2 * | 8/2014 | Menassa | H05K 1/0268 73/862.041 |
| 9,310,265 | B2 * | 4/2016 | Shimoyama | G01L 5/228 |
| 9,400,205 | B2 * | 7/2016 | Geldman | G01G 19/18 |
| 9,617,116 | B2 * | 4/2017 | Brugger | G01G 19/18 |
| 9,902,611 | B2 * | 2/2018 | Brosh | G01L 1/205 |
| 10,209,830 | B2 | 2/2019 | Pedder et al. | |
| 10,801,904 | B2 * | 10/2020 | Yamaguchi | G01L 1/2218 |
| 10,948,367 | B2 * | 3/2021 | Steyn | H05K 1/028 |
| 11,137,299 | B2 * | 10/2021 | Abbasi Gavarti | H10N 30/03 |
| 11,243,130 | B2 * | 2/2022 | Isono | G01L 5/16 |
| 11,473,991 | B2 * | 10/2022 | Alfaro | G01L 9/0052 |
| 11,501,933 | B2 * | 11/2022 | Wu | H03K 17/9625 |
| 11,668,599 | B2 * | 6/2023 | Fritsch | A47B 96/061 177/144 |
| 12,158,382 | B1 * | 12/2024 | Berme | G01G 21/23 |
| 2006/0130596 | A1 | 6/2006 | Wilner | |
| 2006/0283248 | A1 * | 12/2006 | Sugano | B81B 3/0072 73/514.16 |
| 2008/0034897 | A1 * | 2/2008 | Ohsato | G01L 5/162 73/862.629 |

OTHER PUBLICATIONS

Examination Report for European Patent Application No. 22200106.7, mailed Apr. 24, 2025, 6 pages.

* cited by examiner

INPUT STRUCTURES THAT INCLUDE SLOTS THAT CREATE A STRESS CONCENTRATION REGION IN A SUBSTRATE FOR STRAIN DETECTION BY A SENSOR

CROSS-REFERENCE TO RELATED APPLICATION

This application claims the benefit of U.S. Provisional Patent Application No. 63/253,658 filed on Oct. 8, 2021, the disclosure of which is hereby incorporated by reference in its entirety.

TECHNICAL FIELD

The present disclosure relates to input structures that include one or more sensors that are operable to detect strain. More particularly, the present disclosure relates to input structures that provide a stress concentration region proximate to at least one sensor.

BACKGROUND

Some input structures include force or strain sensors to detect an applied pressure or force on an input surface. The strain sensors include strain gauges, piezoelectric sensors and piezoresistive sensors. The strain sensors are attached to a surface to detect strain on that surface. However, in some instances, a strain sensor is less sensitive to the strain (e.g., less able to detect the strain). This lower sensitivity can result in a situation where the strain sensor does not detect strain, or the strain sensor outputs a signal that does not correctly represent an amount of strain on the surface.

SUMMARY

The present disclosure pertains an input structure with one or more sensors operably attached to a substrate. By selectively removing material on a substrate of the input structure, one or more stress concentration regions may be created that increase or maximize stain in each stress concentration region. One or more sensors are proximate to a respective stress concentration region. Since the one or more sensors are proximate to the stress concentration region, the stress concentration region may increase the sensitivity of the one or more sensors. The increase in sensitivity can improve the detectability of the strain by the one or more sensors, which may increase the signal-to-noise ratio of a sensor signal output from the one or more sensors.

In one aspect, a sensor module includes a substrate and a sensor operably attached to the substrate. The sensor is operable to detect a strain on the substrate. A first slot and a second slot are formed in the substrate and configured to create a stress concentration region on the substrate. The stress concentration region is operable to concentrate strain in proximity to the sensor. In some instances, at least one of the first slot or the second slot is arranged along an axis extending through a centerline of the sensor.

In another aspect, an input structure includes an input surface and a sensor module operably attached to the input surface. The sensor module includes a substrate, a first slot and a second slot in the substrate to produce a stress concentration region, and a sensor on the substrate proximate to the first stress concentration region. The sensor is operable to detect strain on the substrate. The stress concentration region is operable to concentrate strain on the substrate proximate to the sensor.

In yet another aspect, a method of providing an input structure includes forming slots in a substrate to create a stress concentration region on the substrate and attaching a sensor to the substrate in proximity to the stress concentration region. The substrate is attached to an input surface, where a stress on the input surface produces a strain on the substrate. The stress concentration region is operable to concentrate strain proximate to the sensor.

In some implementations, a respective width of each of the first slot and the second slot is less than a width of the sensor. Optionally, the respective width of each of the first slot and the second slot is equal to or less than about one (1) millimeter (mm).

In some implementations, the first slot and the second slot divide the substrate into a first region, a second region, and a third region, the third region connecting the first region and the second region. Optionally, the sensor is arranged on the third region of the substrate. Additionally or alternatively, the sensor is spaced approximately equally from each of a pair of opposing edges of the third region, the pair of opposing edges of the third region being defined by the first slot and the second slot. Optionally, the width of the third region is about 2 mm.

In some implementations, the sensor is a chip scale package sensor.

In some implementations, the substrate is a flexible printed circuit, a printed circuit board, or rigid-flex circuit board.

In some implementations, a stiffener layer can be attached to the substrate.

In some implementations, the first slot and the second slot define a first portion of the substrate and a second portion of the substrate. The sensor may be arranged at least partially on each of the first portion and the second portion of the substrate.

In some implementations, a centerline of the sensor is aligned with an end of one of the first slot or the second slot.

In some implementations, a width of the sensor is less than a width of the first slot. Optionally the width of the sensor is approximately equal to a width of the second slot.

In some implementations, the sensor module is spaced approximately equally from the first slot and the second slot.

In some implementations, a respective distance from the sensor to each of the first slot and the second slot is about 0.35 mm.

In some implementations, multiple sensors can be operably attached to the substrate, with one or more slots formed proximate to each sensor to produce a stress concentration region proximate to each sensor.

In some embodiments, one or more sensors may be proximate to a single stress concentration region.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE FIGURES

The components in the drawings are not necessarily to scale relative to each other. Like reference numerals designate corresponding parts throughout the several views.

These and other features of will become more apparent in the detailed description in which reference is made to the appended drawings wherein.

DETAILED DESCRIPTION

Figure 1:
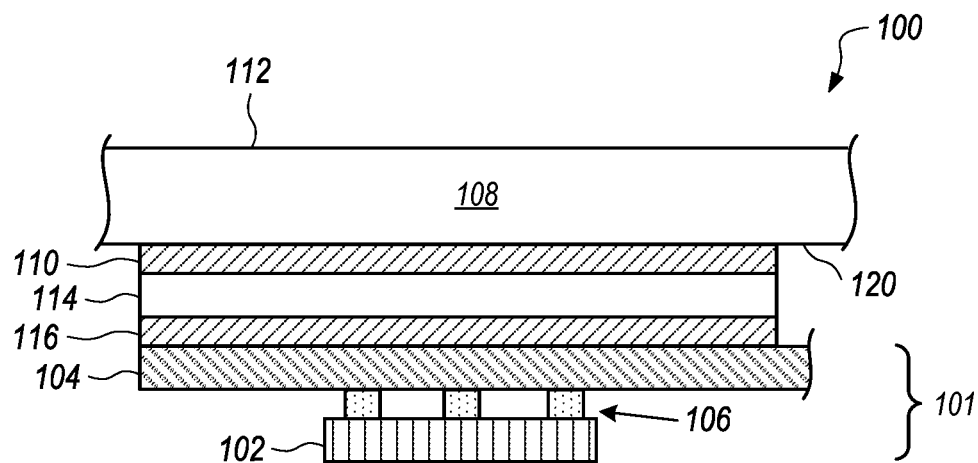
FIG. 1 illustrates a cross-sectional view of an example input structure in accordance with embodiments of the disclosure.

The present disclosure can be understood more readily by reference to the following detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments disclosed herein relate to input structure designs, where the input structure includes one or more sensors that are operable to detect strain on a substrate. The input structure designs provide a stress concentration region proximate to at least one sensor. Each stress concentration region is operable to concentrate strain on the substrate in the area of the stress concentration region. Since each stress concentration region is proximate to at least one respective sensor, the stress concentration region is operable to concentrate strain proximate to the at least one sensor. For example, the stress concentration region may surround a sensor. Alternatively, the stress concentration region may be along one or more sides of a sensor. Each stress concentration region can improve the detectability of strain by the at least one sensor, which improves the performance of the at least one sensor.

When a pressure or a force (e.g., a stress) is applied to an input structure near a sensor, the stress creates a curvature on the input surface. The curvature on the input surface causes the substrate to bend, which creates a strain on the substrate. When the substrate does not include any slots (e.g., a non-slotted substrate), the strain on the non-slotted substrate follows or corresponds to the shape of the curvature of the input surface. Thus, the strain can spread out on the substrate along the shape of the curvature. This can reduce the detectability of the strain by the sensor. When one or more slots are formed in the substrate, the substrate bends on a smaller scale and the location of the strain is modified. The strain is concentrated in the area proximate to the one or more slots. Accordingly, positioning the sensor proximate to the concentrated strain can increase the detectability of the strain by the sensor.

FIG. 1 illustrates a cross-sectional view of an example input structure 100 in accordance with embodiments of the disclosure. The input structure 100 includes a sensor module 101 that is comprised of one or more sensors (collectively referred to as sensor 102) operably attached to a substrate 104 through electrical connectors 106. The sensor 102 is operable to detect strain on the substrate 104. In certain embodiments, the sensor 102 is a metal foil strain gauge sensor, a Wheatstone bridge strain sensor, a piezoresistive strain sensor, a piezoelectric strain sensor, an optical strain sensor, or combinations thereof. In some implementations, the sensor 102 can be a chip scale package sensor.

Non-limiting nonexclusive examples of the substrate 104 include flexible printed circuits (FPC), printed circuit boards (PCB), or rigid-flex PCBs. Additionally, non-limiting non-exclusive examples of the electrical connectors 106 include solder balls and copper pillars.

The sensor module 101 is attached to an input surface 108 by a first adhesive layer 110. A first surface 112 of the input surface 108 is configured to receive physical inputs, such as pressure or force inputs. In certain embodiments, a stiffener layer 114 is positioned between the first adhesive layer 110 and a second adhesive layer 116. The second adhesive layer 116 is used to attach the stiffener layer 114 to the substrate 104, while the first adhesive layer 110 is used to attach the stiffener layer 114 to a second surface 118 of the input surface 108. The stiffener layer 114 may be formed of a metal such as stainless steel, aluminum, or titanium, glass, ceramic, carbon-fiber composites, plastic, and combinations thereof. The input surface 108 can be formed of any suitable material, including, but not limited to, glass, plastic, metal, an elastic material, or combinations thereof.

Figure 2:
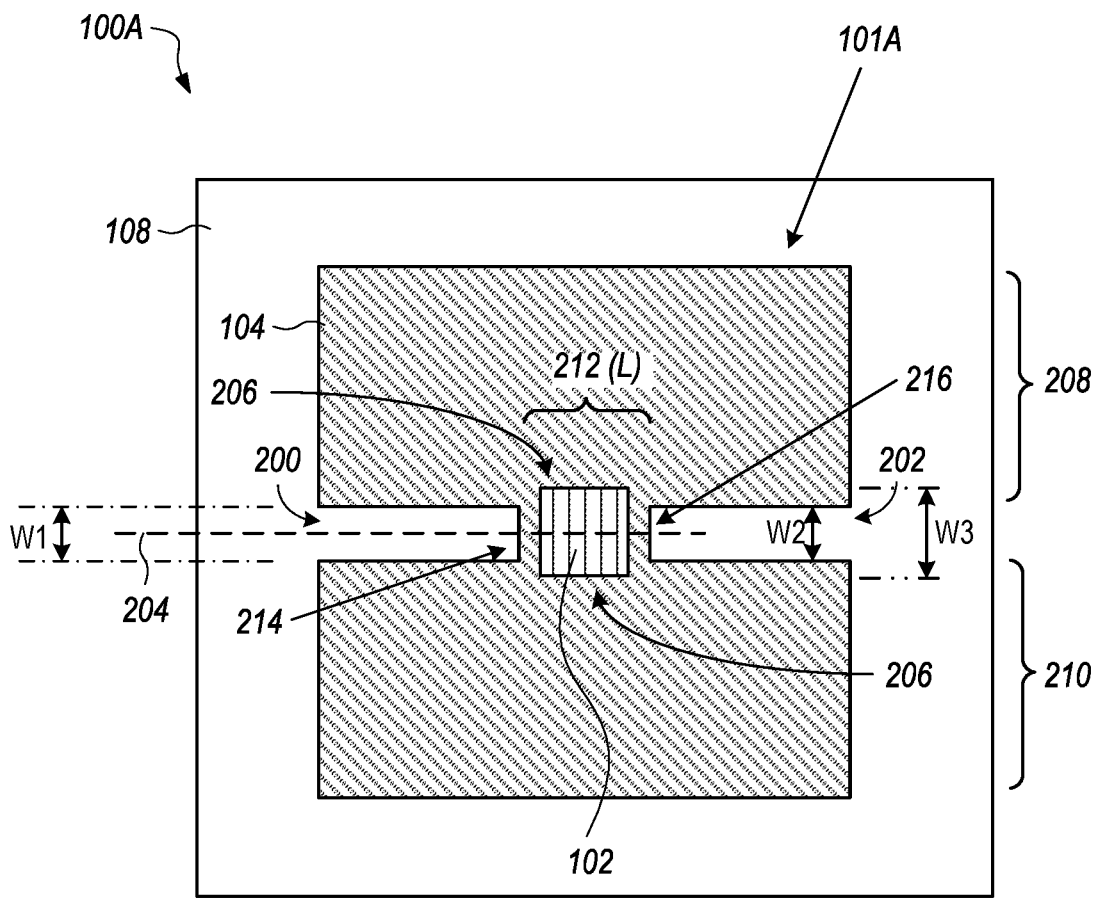
FIG. 2 illustrates a block diagram of a bottom view of a first example implementation of the input structure shown in FIG. 1 with slots formed in the substrate in accordance with embodiments of the disclosure.

FIG. 2 illustrates a block diagram of a bottom view of a first example implementation of the input structure 100 shown in FIG. 1 with slots 200, 202 formed in the substrate 104 in accordance with embodiments of the disclosure. The sensor module 101A of the input structure 100A includes the sensor 102 operably attached to the substrate 104. The sensor module 101A is positioned below the input surface 108. The substrate 104 can include the first slot 200 and the second slot 202 formed on opposite sides of the sensor 102. In certain embodiments, the first slot 200 and the second slot 202 are arranged along an axis 204 extending through a centerline of the sensor 102. The first slot 200 and the second slot 202 can be configured to create a stress concentration region 206 on the substrate 104 in proximity to the sensor 102. In FIG. 2, the stress concentration region 206 is in proximity to the axis 204.

The stress concentration region 206 is operable to concentrate a strain on the substrate 104 in the area of the stress concentration region 206. Since the stress concentration region 206 is proximate to the sensor 102, the stress concentration region 206 is operable to concentrate strain proximate to the sensor 102. For example, the stress concentration region 206 may surround the sensor 102. Alternatively, the stress concentration region 206 may be along one or more sides of the sensor 102. The stress concentration region 206 can improve the detectability of strain by the sensor 102, which improves the performance of the sensor 102 (e.g., increases the signal-to-noise ratio of an output signal).

In some embodiments, a width W1 of the first slot 200 and a width W2 of the second slot 202 are less than a width W3 of the sensor 102, as shown in FIG. 2. In some instances, the widths W1, W2 can assist in concentrating the strain in the stress concentration region 206 when the widths W1, W2 are less than the width W3. However, other embodiments contemplate that the parts of the sensor module 101A can be made with different sizes and proportions. In some implementations, the width W1 of the first slot 200 and the width W2 of the second slot 202 is equal to or less than about one (1) millimeter (mm). It should be understood that the one (1) mm width is provided only as an example. In certain embodiments, the width W1 of the first slot 200 and/or the width W2 of the second slot 202 can be greater or less than one (1) mm. In some embodiments, the width W1 the first slot 200 and the width W2 of the second slot 202 are approximately equal. In other embodiments, the width W1 of the first slot 200 and the width W2 of the second slot 202 are different.

The length L of the third region can be any suitable length. As a non-limiting example, the length L of the third region 212 can be about two (2) mm. It should be understood that the two (2) mm length is provided only as an example. Other embodiments contemplate that the length L of the third region 212 can be greater or less than two (2) mm.

In some embodiments, the first slot 200 and the second slot 202 divide the substrate 104 into a first region 208, a second region 210, and a third region 212, where the third region 212 connects the first region 208 and the second region 210. The sensor 102 can be on the third region 212 of the substrate 104. A pair of opposing edges 214, 216 of the first slot 200 and the second slot 202, respectively, can define the edges of the third region 212. In some implementations, the sensor 102 is optionally approximately an equal distance from the edge 214 of the first slot 200 and from the edge 216 of the second slot 202. It should be understood that different amounts of distances can be between the sensor 102 and the edge 214 and/or the sensor 102 and the edge 216. In some embodiments, the distances can be determined by one or more design rules for a layout of a circuit, an integrated circuit (e.g., a chip scale package), and/or a circuit board.

In other embodiments, the sensor module 101A shown in FIG. 2 can be rotated or formed in different orientations within the input structure 100A. For example, it should be understood that the first slot 200 and the second slot 202, which are shown in FIG. 2 on the left and right sides of the sensor 102 respectively, may be arranged on the top and bottom sides of the sensor 102. Similarly, it should be understood that the sensor module 101A can be rotated to any position with respect to the input surface 108.

Figure 3:
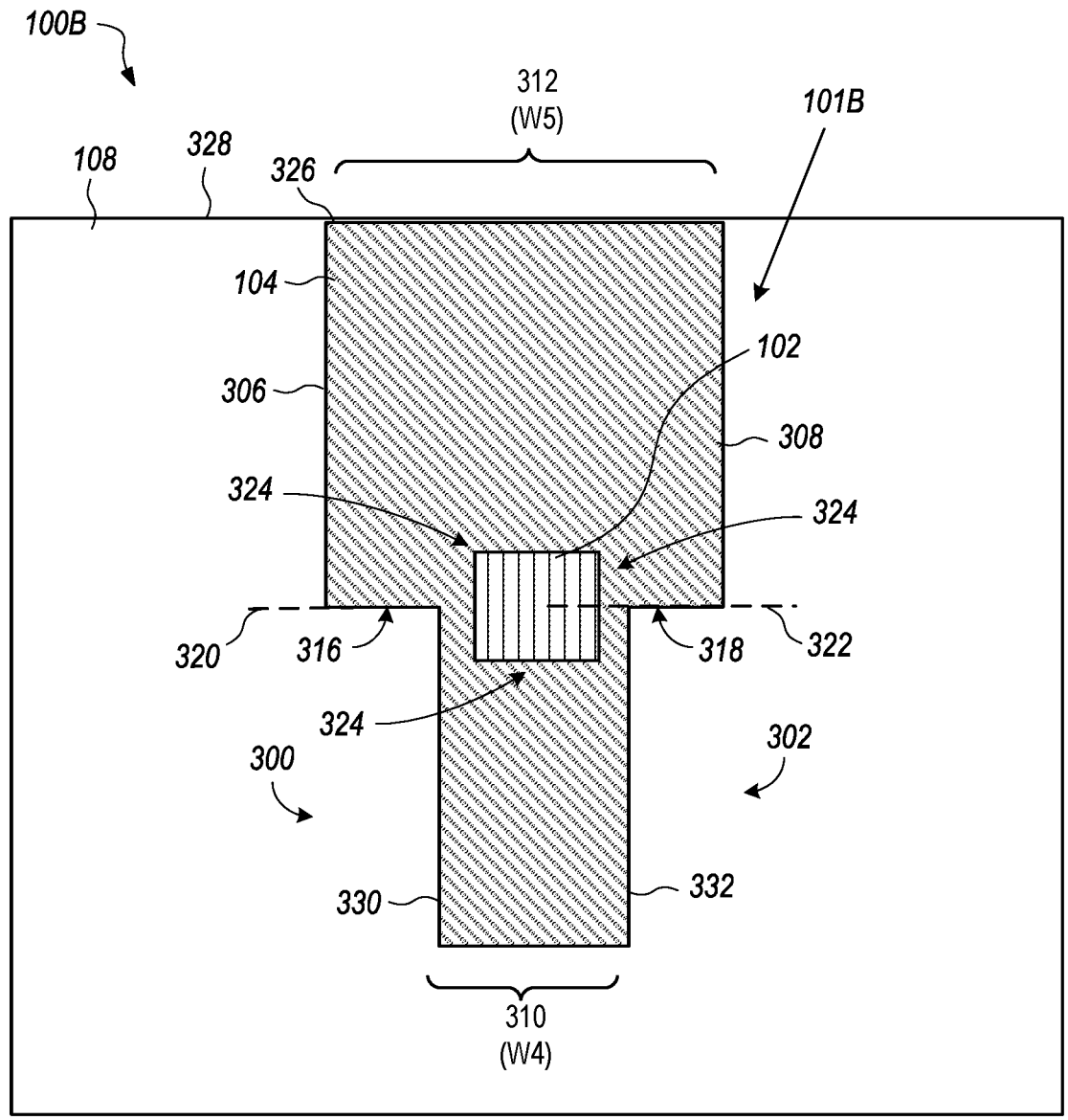
FIG. 3 illustrates a block diagram of a bottom view of a second example implementation of the input structure shown in FIG. 1 with slots formed in an elongate substrate in accordance with embodiments of the disclosure.

FIG. 3 illustrates a block diagram of a bottom view of a second example implementation of the input structure 100 shown in FIG. 1 with slots 300, 302 formed in the substrate 104 in accordance with embodiments of the disclosure. The sensor module 101B of the input structure 100B is positioned below the input surface 108. The substrate 104 can include the first slot 300 formed along a first peripheral edge 306 of a portion of the substrate 104 and the second slot 302 formed along a second peripheral edge 308 of the portion of the substrate 104. Since the first slot 300 and the second slot 302 are formed along respective peripheral edges 306, 308, the first slot 300 may be referred to as a first cutout of the substrate 104 and the second slot 302 as a second cutout of the substrate 104.

The substrate 104 is elongated and includes a first portion 310 and a second portion 312. A width W4 of the first portion 310 can be less than a width W5 of the second portion 312. In some instances, the difference between the widths W4, W5 can assist in concentrating the strain in the stress concentration region 324. In some embodiments, an edge 316 of the first slot 300 and an edge 318 of the second slot 302 are aligned with a boundary 320 between the first portion 310 and the second portion 312 of the substrate 104. In certain embodiments, the boundary 320 is aligned with a centerline 322 of the sensor 102.

The first portion 310 and the second portion 312 can be configured to create a stress concentration region 324 on the substrate 104 in proximity to the sensor 102. In FIG. 3, the stress concentration region 324 is in proximity to the boundary 320. In certain embodiments, the sensor 102 can be arranged so that it is partially on the first portion 310 and partially on the second portion 312 of the substrate 304 so that the sensor 102 is arranged in proximity to the stress concentration region 324. The stress concentration region 324 is operable to concentrate a strain on the substrate 104 in the area of the stress concentration region 324. Since the stress concentration region 324 is proximate to the sensor 102, the stress concentration region 324 is operable to concentrate strain proximate to the sensor 102. For example, the stress concentration region 324 may surround the sensor 102. Alternatively, the stress concentration region 324 may be along one or more sides of the sensor 102. The stress concentration region 324 can improve the detectability of the strain by the sensor 102, which improves the performance of the sensor 102 (e.g., increases the signal-to-noise ratio of an output signal).

As described previously, other embodiments contemplate the sensor 102 and the substrate 104 can each be formed with different sizes and proportions. For example, a peripheral edge 326 of the substrate 104 is shown as being aligned with a peripheral edge 328 of the input surface 108. Other embodiments are not limited to this configuration. The substrate 104 can be positioned at any location with respect to the input surface 108.

Some embodiments include implementations where the sensor module 101B and/or the sensor 102 are configured as a chip scale package sensor. In the illustrated embodiment, a first peripheral edge 330 of the first portion 310 is inset from the first peripheral edge 306 of the second portion 312, and a second peripheral edge 332 of the first portion 310 is inset from the second peripheral edge 308 of the second portion 312. In certain embodiments, an amount of inset for the first peripheral edge 330 of the first portion 310 and an amount of inset for the second peripheral edge 332 of the first portion 310 is about one (1) mm or more. In other embodiments, the amount of inset for the first peripheral edge 330 of the first portion 310 and the amount of inset for the second peripheral edge 332 of the first portion 310 can be equal amounts of inset or the amounts of insets may differ.

Figure 4:
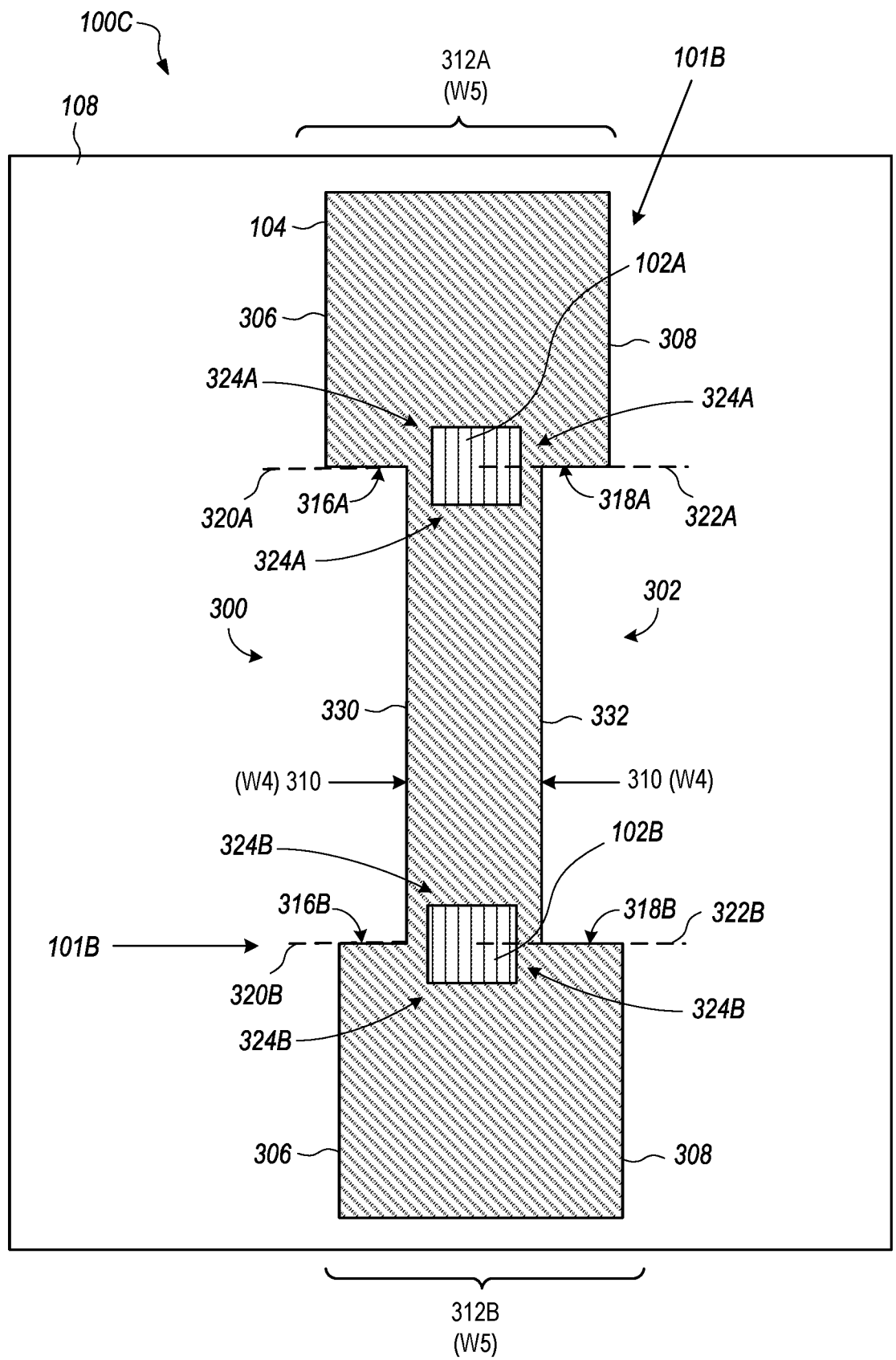
FIG. 4 illustrates a block diagram of a bottom view of a third example implementation of the input structure shown in FIG. 1 that includes multiple sensor modules in accordance with embodiments of the disclosure.

FIG. 4 illustrates a block diagram of a bottom view of a third example implementation of the input structure 100 shown in FIG. 1 that includes multiple sensor modules 101B in accordance with embodiments of the disclosure. The illustrated input structure 100C includes two of the sensor modules 101B shown in FIG. 3 on a single substrate 104 with the first slot 300 and the second slot 302 formed in the substrate 104. The sensor modules 101B are positioned below the input surface 108.

The first slot 300 is formed along a first peripheral edge 306 of a portion of the substrate 304 and the second slot 302 is formed along a second peripheral edge 308 of the portion of the substrate 304. Since the first slot 300 and the second slot 302 are formed along respective peripheral edges 306, 308, the first slot 300 may be referred to as a first cutout of the substrate 304 and the second slot 302 as a second cutout of the substrate 304.

The substrate 104 includes a first portion 310, an upper second portion 312A, and a lower second portion 312B. A width W4 of the first portion 310 can be less than a width W5 of the upper second portion 312A and the lower second portion 312B. The sensor modules 101B each include the sensor 102A, 102B that is operable to detect strain on the substrate 104. In some embodiments, an upper edge 316A of the first slot 300 and an upper edge 318A of the second slot 302 are aligned with a boundary 320A between the first portion 310 and the upper second portion 312A of the substrate 104. Similarly, a lower edge 316B of the first slot 300 and a lower edge 318B of the second slot 302 are aligned with a boundary 320B between the first portion 310 and the lower second portion 312B of the substrate 104. In certain embodiments, the boundary 320A and the boundary 320B are each aligned with a respective centerline 322A, 322B of the sensors 102A, 102B.

The first portion 310 and the upper second portion 312A can be configured to create a stress concentration region 324A on the substrate 104 in proximity to the sensor 102A. In FIG. 4, the stress concentration region 324A is in proximity to the boundary 320A. In certain embodiments, the sensor 102A can be arranged so that it is partially on the first portion 310 and partially on the upper second portion 312A of the substrate 104 so that the sensor 102A is arranged in proximity to the stress concentration region 324A.

The first portion 310 and the lower second portion 312B can be configured to create a stress concentration region 324B on the substrate 104 in proximity to the sensor 102B. In FIG. 4, the stress concentration region 324B is in proximity to the boundary 320B. In certain embodiments, the sensor 102B can be arranged so that it is partially on the first portion 310 and partially on the lower second portion 312B of the substrate 104 so that the sensor 102B is arranged in proximity to the stress concentration region 324B.

As described previously, the stress concentration regions 324A, 324B are each operable to concentrate a strain on the substrate 104 in the area of the stress concentration regions 324A, 324B. Since the sensors 102A, 102B are each proximate to a respective stress concentration region 324A, 324B, the respective stress concentration regions 324A, 324B are operable to concentrate strain proximate to the sensors 102A, 102B. The stress concentration regions 324A, 324B can improve the detectability of the strain by the sensors 102A, 102B, and may therefore increase the accuracy of strain measurements by the sensors 102A, 102B.

Other embodiments contemplate that the sensor 102A, the sensor 102B, and the substrate 104 can each be formed with different sizes and proportions. Additionally, the input structure 100C may include any number of sensor modules (e.g., any number of sensors). In certain embodiments, the sensor modules 101B and/or the sensors 102A, 102B are configured as a chip scale package sensor.

In the illustrated embodiment, a first peripheral edge 330 of the first portion 310 is inset from the first peripheral edge 306 of the upper second portion 312A and the lower second portion 312B, and a second peripheral edge 332 of the first portion 310 is inset from the second peripheral edge 308 of the upper second portion 312A and the lower second portion 312B. Additionally or alternatively, the width W5 of the upper second portion 312A can be the same as, or differ from, the width W5 of the lower second portion 312B.

In certain embodiments, an amount of the inset for the first peripheral edge 330 of the first portion 310 and an amount of the inset for the second peripheral edge 332 of the first portion 310 is about one (1) mm or more. However, the amount of inset for the first peripheral edge 330 and the amount of inset for the second peripheral edge 332 can be equal amounts of inset or the amounts of inset may differ. In some embodiments, the amounts of the insets can be determined by one or more design rules for a layout of a circuit, an integrated circuit (e.g., a chip scale package), and/or a circuit board.

Figure 5:
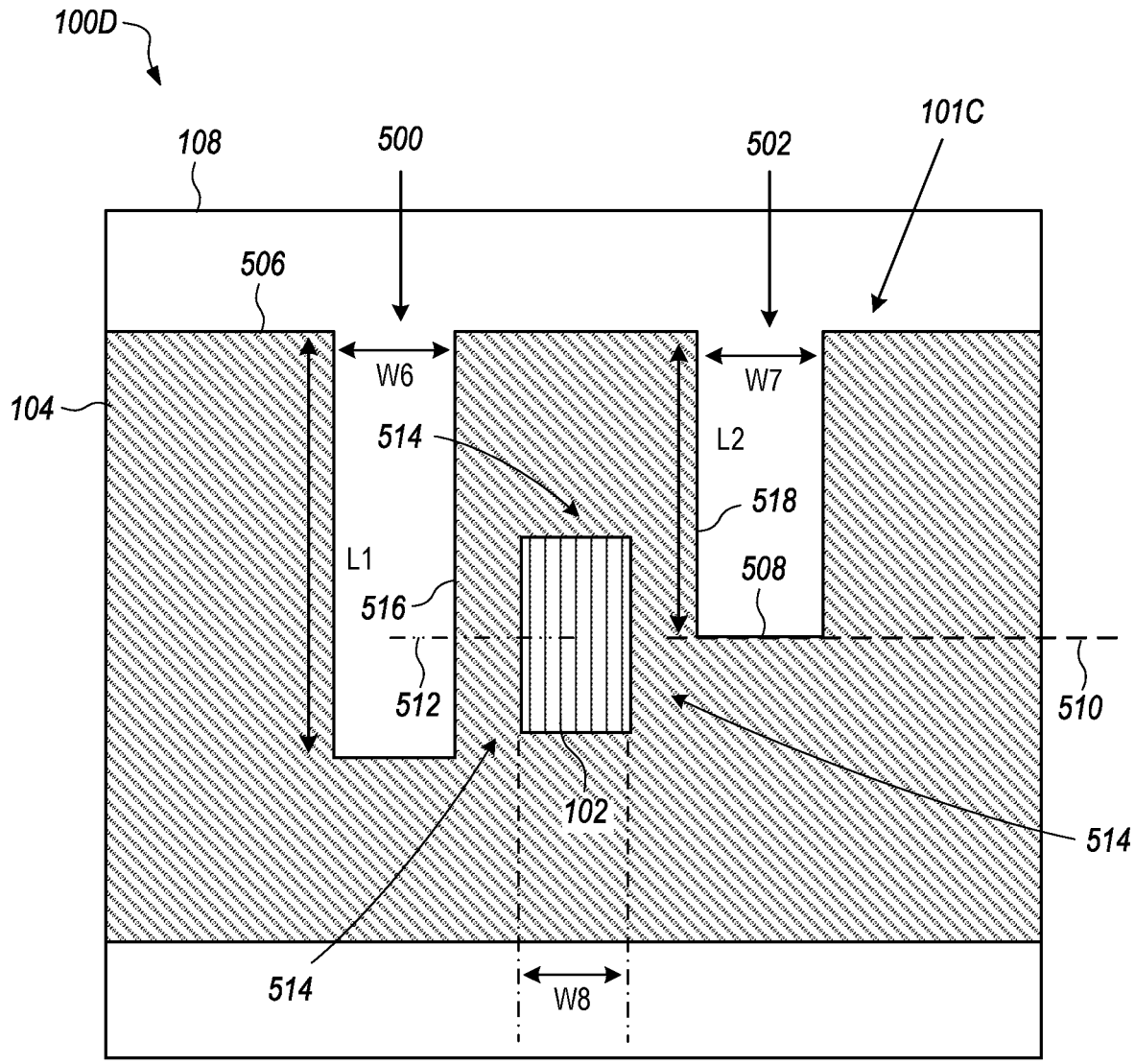
FIG. 5 illustrates a block diagram of a bottom view of a fourth example implementation of the input structure shown in FIG. 1 with slots formed in the substrate in accordance with embodiments of the disclosure.

FIG. 5 illustrates a block diagram of a bottom view of a fourth example implementation of the input structure 100 shown in FIG. 1 with slots 500, 502 formed in the substrate 104 in accordance with embodiments of the disclosure. The sensor module 101C of the input structure 100D includes the sensor 102 operably attached to the substrate 104. The sensor module 101C is positioned below the input surface 108. The substrate 104 can include a first slot 500 and a second slot 502 that may be substantially parallel to each other and formed on opposite sides of the sensor 102.

In certain embodiments, the first slot 500 and the second slot 502 are formed at a first surface 506 of the substrate 104. In certain embodiments, a length L1 of the first slot 500 may be longer than a length L2 of the second slot 502. Additionally, the edge 510 of the second slot 502 may extend through a centerline 512 of the sensor 102. The first slot 500 and the second slot 502 can be configured to create a stress concentration region 514 on the substrate 104 in proximity to the sensor 102. As described earlier, the stress concentration region 514 is operable to concentrate a strain on the substrate 104 in the area of the stress concentration region 514. Since the stress concentration region 514 is proximate to the sensor 102, the stress concentration region 514 is operable to concentrate strain proximate to the sensor 102. For example, the stress concentration region 514 may surround the sensor 102. Alternatively, the stress concentration region 514 may be along one or more sides of the sensor 102. The stress concentration region 514 can improve the detectability of strain by the sensor 102, which improves the performance of the sensor 102.

In some embodiments, a width W6 of the first slot 500 and a width W7 of the second slot 502 can be the same or may differ. In some implementations, the width W8 of the sensor 102 is less than the width W6 and the width W7. As a non-limiting example, the width W8 can be less than one (1) mm, and the widths W6, W7 can be one (1) mm or more. In some implementations, the width W8 is approximately equal to the width W6 and/or the width W7.

It should be understood that the less than one (1) mm width for W8 and the one (1) mm width for W6, W7 are provided only as examples. Other embodiments contemplate that the widths W6, W7 can be greater or less than one (1) mm, and the width W8 may be greater than one (1) mm. In some embodiments, the same amount of distance is between the sensor 102 and the edge 516 of the first slot 500 and the edge 518 of the second slot 502. As a non-limiting nonexclusive example, the distance between the sensor 102 and the edges 516, 518 is approximately 0.35 mm. In other embodiments, the distance between the sensor 102 and the edge 516 of the first slot 500 differs from the distance between the sensor 102 and the edge 518 of the second slot 502. In some embodiments, the distance between the sensor 102 to the edge 516 and to the edge 518 can be determined by one or more design rules for a layout associated with a circuit, an integrated circuit (e.g., the chip scale package), and/or a circuit board. Additionally or alternatively, the sensor module 101C shown in FIG. 5 can be rotated or formed in different orientations within the input structure 100D.

Figure 6:
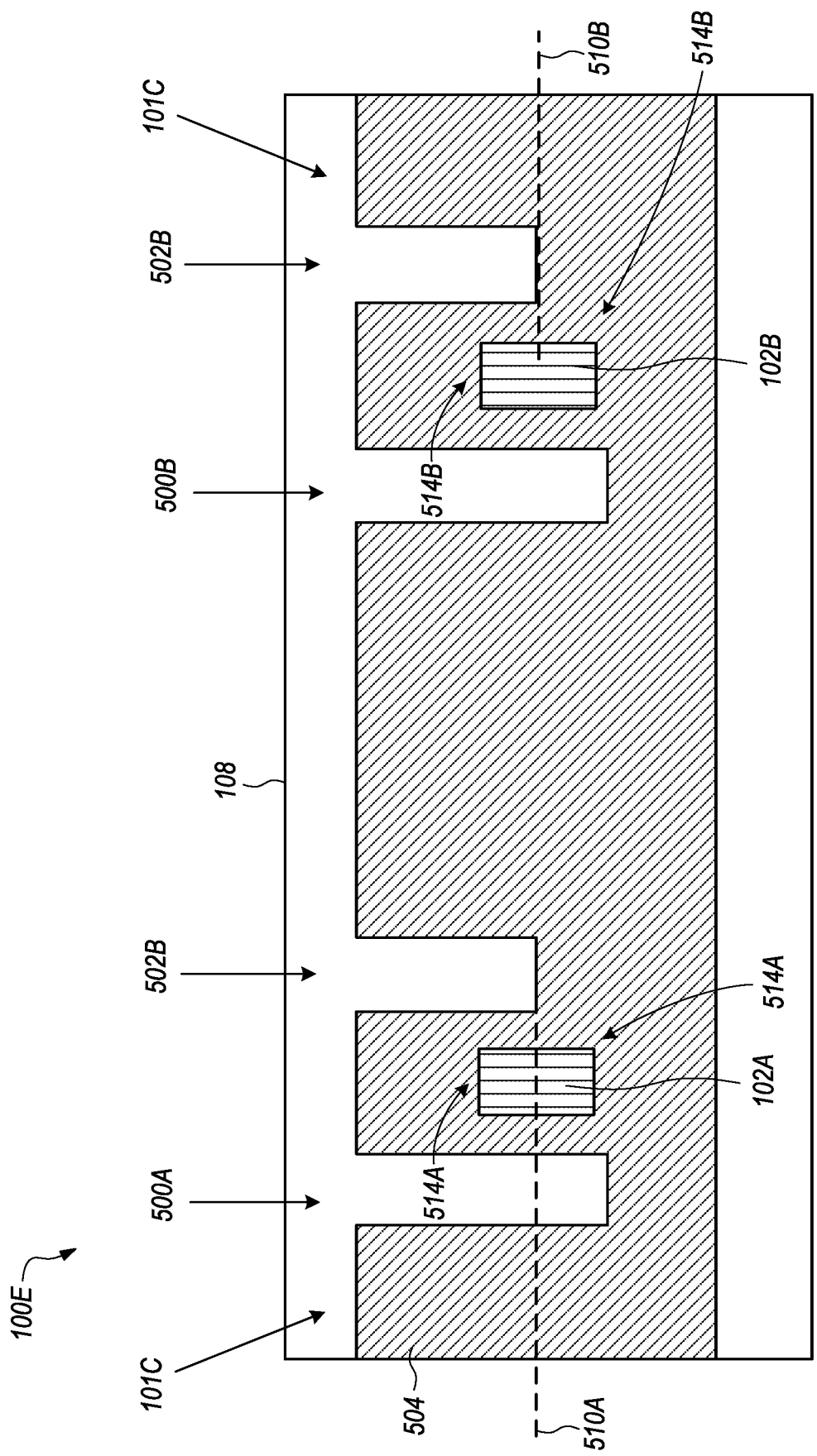
FIG. 6 illustrates a block diagram of a bottom view of a fifth example implementation of the input structure shown in FIG. 1 that includes multiple sensor modules in accordance with embodiments of the disclosure.

FIG. 6 illustrates a block diagram of a bottom view of a fifth example implementation of the input structure 100 shown in FIG. 1 that includes multiple sensor modules 101C in accordance with embodiments of the disclosure. The illustrated input structure 100E includes two of the sensor modules 101C shown in FIG. 5 on a single substrate 104 with a first set of the first slot 500A and the second slot 502A formed in the substrate 104 and with a second set of the first slot 500B and the second slot 502B formed in the substrate 104. The sensor modules 101C are positioned below the input surface 108.

In FIG. 6, the lengths of the first slots 500A, 500B may be longer than the lengths of the second slots 502A, 502B. Additionally, the edges 510A, 510B of the second slots 502A, 502B, may extend through a respective centerline of the sensors 102A, 102B. The first set of the first slot 500A and the second slot 502A can be configured to create a stress concentration region 514A on the substrate 104 in proximity to the sensor 102A. The second set of the first slot 500B and the second slot 502B can be configured to create a stress concentration region 514B on the substrate 104 in proximity to the sensor 102B. The stress concentration regions 514A, 514B are operable to concentrate a strain on the substrate 104 in the areas of the respective stress concentration regions 514A, 514B. Since the stress concentration regions 514A, 514B are proximate to respective sensors 102A, 102B, the stress concentration regions 514A, 514B are operable to concentrate strain proximate to the respective sensors 102A, 102B. The stress concentration regions 514A, 514B can improve the detectability of strain by the sensors 102A, 102B, and may therefore increase the accuracy of strain measurements by the sensors 102A, 102B. Improved detectability of strain and/or accuracy of the strain measurements may improve the performance of the sensors 102A, 102B.

In some embodiments, a width of the first slot 500A and a width of the second slot 502A can be the same or may differ, and a width of the first slot 500B and a width of the second slot 502B can be the same or may differ. In certain embodiments, the widths of the first slots 500A, 500B and the widths of the second slots 502A, 502B all differ from each other. Alternatively, at least one of the widths of the first slots 500A, 500B and the widths of the second slots 502A, 502B differs from the other widths. In some embodiments, the widths of the sensors 102A, 102B are less than the widths of the first slots 500A, 500B and the second slots 502A, 502B.

The distances between the sensors 102A, 102B and the first slots 500A, 500B and the distances between the sensors 102A, 102B and the second slots 502A, 502B can all be the same distances. In other embodiments, the distance between the sensors 102A, 102B and at least one of the first slots 500A, 500B differs from distance between the sensors 102A, 102B and at least one of the second slots 502A, 502B. In some embodiments, the distances between the sensors 102A, 102B to the first slots 500A, 500B and the second slots 502A, 502B can be determined by one or more design rules for a layout of a circuit, an integrated circuit (e.g., the chip scale package), and/or a circuit board. Additionally or alternatively, the sensor modules 101C can be rotated or formed in different orientations within the input structure 100E.

Because the lengths of the example first slots 500A, 500B extend to, or past, the sensors 102A, 102B, the first slots 500A, 500B can prevent or reduce the transfer of strain from one sensor module 101C to the other sensor module 101C. In certain embodiments, the first slot 500A and the second slot 502A can be flipped in orientation with respect to the sensor 102A. Additionally or alternatively, the first slot 500B and the second slot 502B can be flipped in orientation with respect to the sensor 102B.

While the embodiment shown in FIG. 6 depicts two sensor modules 101C where the first slots 500A, 500, the second slots 502A, 502B, and the sensors 102A, 102B are similar in sizes and shapes, it is contemplated that the sensors 102A, 102B can be different sizes, shapes, or types, and that the first slots 500A, 500B and the second slots 502A, 502B may be arranged around each sensor 102A, 102B differently and can have different sizes and/or shapes. Additionally, the input structure 100E may include any number of sensor modules (e.g., any number of sensors).

Figure 7:
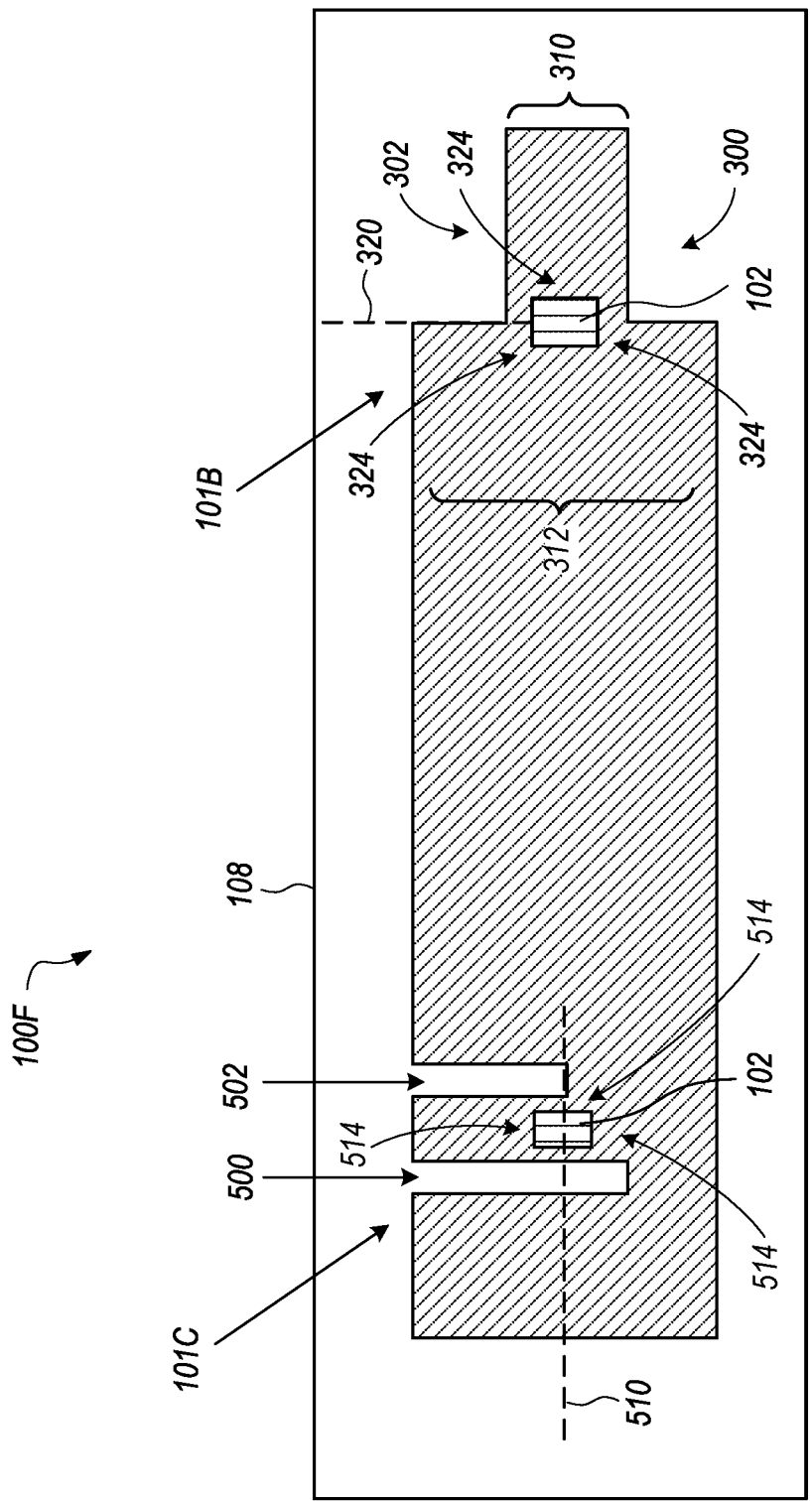
FIG. 7 illustrates a block diagram of a bottom view of a sixth example implementation of the input structure shown in FIG. 1 that includes multiple sensor modules in accordance with embodiments of the disclosure.

FIG. 7 illustrates a block diagram of a bottom view of a sixth example implementation of the input structure 100 shown in FIG. 1 that includes multiple sensor modules 101B, 101C in accordance with embodiments of the disclosure. The illustrated input structure 100F includes the sensor module 101B shown in FIG. 3 and the sensor module 101C shown in FIG. 5. The sensor module 101B is oriented in a first orientation and the sensor module is oriented in a second orientation. With respect to the sensor module 101B, the substrate 104 includes the first slot 300 and the second slot 302. The first slot 300 and the second slot 302 define the first portion 310 and the second portion 312. In certain embodiments, the boundary 320 is aligned with a centerline of the sensor 102.

The first portion 310 and the second portion 312 are configured to create the stress concentration region 324 on the substrate 104 in proximity to the sensor 102. In certain embodiments, the sensor 102 can be arranged so that it is partially on the first portion 310 and partially on the second portion 312 of the substrate 304 so that the sensor 102 is arranged in proximity to the stress concentration region 324. The stress concentration region 324 is operable to concentrate a strain on the substrate 104 in the area of the stress concentration region 324. Since the stress concentration region 324 is proximate to the sensor 102, the stress concentration region 324 is operable to concentrate strain proximate to the sensor 102. The stress concentration region 324 can improve the detectability of the strain by the sensor 102, and may therefore increase the accuracy of strain measurements by the sensor 102, which improves the performance of the sensor 102. The other aspects of the sensor module 101B described in conjunction with FIG. 3 apply to this embodiment as well but are not repeated herein for brevity.

The sensor module 101C includes the first slot 500 and the second slot 502 that may be substantially parallel to each other and formed on opposite sides of the sensor 102. The edge 510 of the second slot 502 may extend through a centerline of the sensor 102. The first slot 500 and the second slot 502 are configured to create the stress concentration region 514 on the substrate 104 in proximity to the sensor 102. As described earlier, the stress concentration region 514 is operable to concentrate a strain on the substrate 104 in the area of the stress concentration region 514. Since the stress concentration region 514 is proximate to the sensor 102, the stress concentration region 514 is operable to concentrate strain proximate to the sensor 102. The stress concentration region 514 can improve the detectability of strain by the sensor 102, and may therefore increase the accuracy of strain measurements by the sensor 102. Improved detectability of strain and/or accuracy of the strain measurements may improve the performance of the sensor 102. The other aspects of the sensor module 101C described in conjunction with FIG. 5 apply to this embodiment as well but are not repeated herein for brevity.

Figure 8:
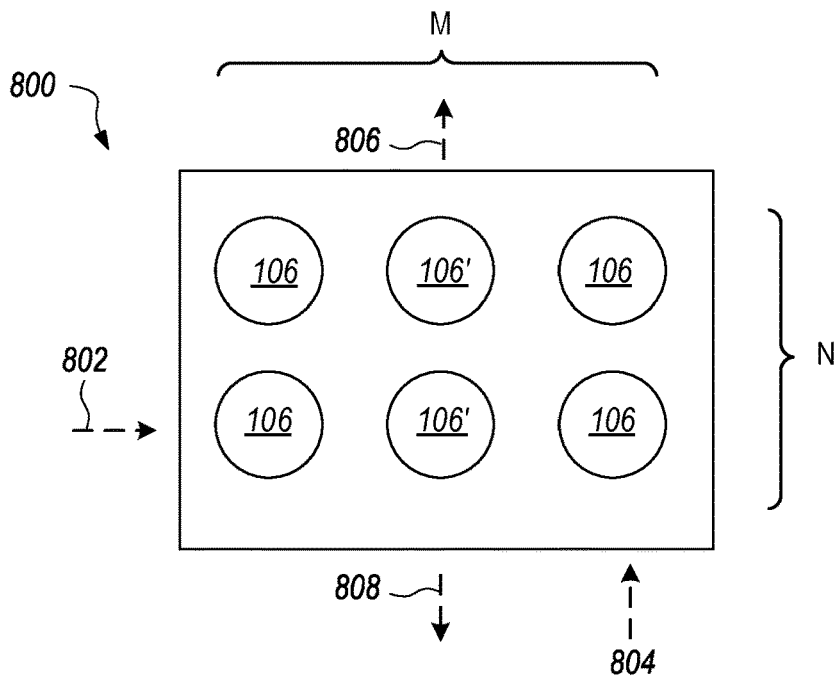
FIG. 8 illustrates an example first implementation of the electrical connectors shown in FIG. 1 in accordance with embodiments of the disclosure.

Placement of the slots in a substrate may be based on a layout or arrangement of the electrical connectors that operably connect a sensor to the substrate (e.g., the electrical connectors 106 shown in FIG. 1). FIG. 8 illustrates an example first implementation 800 of the electrical connectors 106 shown in FIG. 1 in accordance with embodiments of the disclosure. The electrical connectors 106 are arranged in an array that includes M lines of electrical connectors 106 (e.g., columns) and N lines of electrical connectors 106 (e.g., rows), where M differs from N. For example, as shown in FIG. 8, M equals three (3) and N equals two (2). To increase or maximize the effectiveness of a stress concentration region, one or more slots in the substrate may be arranged along (or aligned with) a direction that is orthogonal to the lines of electrical connectors 106 that have the higher number of electrical connectors 106. For example, in FIG. 8, the line 802 of electrical connectors 106 has three (3) electrical connectors 106 and the line 804 of electrical connectors has two (2) electrical connectors 106. Since the number of electrical connectors 106 in line 802 is greater than the number of electrical connectors 106 in line 804, one or more slots may be formed in the substrate in a direction that is orthogonal to the direction represented by line 802. Thus, a slot can be arranged along the direction represented by arrow 806 and/or by arrow 808. In certain embodiments, a centerline or an edge of the slot is aligned with the arrow 806 and/or the arrow 808. In other embodiments, a slot may be arranged in a direction other than the directions represented by arrows 806, 808.

Figure 9:
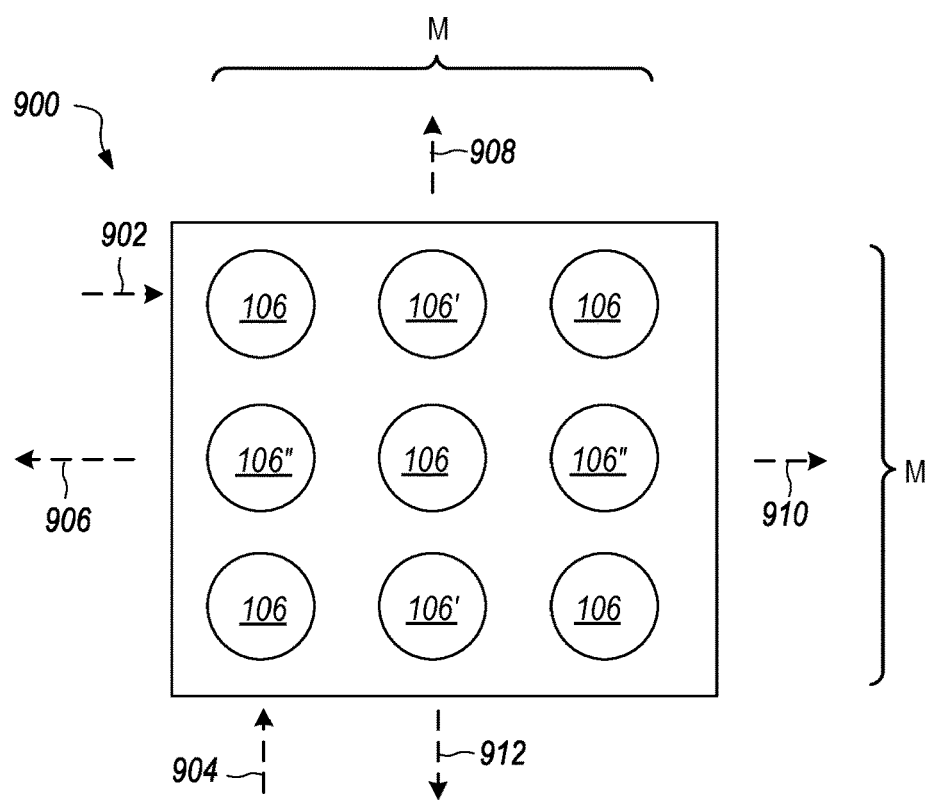
FIG. 9 illustrates an example second implementation of the electrical connectors shown in FIG. 1 in accordance with embodiments of the disclosure.

FIG. 9 illustrates an example second implementation 900 of the electrical connectors 106 shown in FIG. 1 in accordance with embodiments of the disclosure. In other embodiments, the electrical connectors 106 are arranged in an array that includes M lines of electrical connectors 106 (e.g., columns) and M lines of electrical connectors 106 (e.g., rows). For example, as shown in FIG. 9, M equals three (3). As described earlier, to increase or maximize the effectiveness of a stress concentration region, one or more slots in the substrate are aligned in a direction that is orthogonal to the lines of electrical connectors 106 that have the higher number of electrical connectors 106. For example, in FIG. 9, the line 902 of electrical connectors 106 has three (3) electrical connectors and the line 904 of electrical connectors 106 has three (3) electrical connectors. Since the lines 902, 904 have the same number of electrical connectors 106, one or more slots can be arranged in a direction that is orthogonal to the direction represented by line 902 and/or in a direction that is orthogonal to the direction represented by line 904. Thus, a slot can be arranged along the direction represented by one or more of arrow 906, arrow 908, arrow 910, or arrow 912. In certain embodiments, a centerline or an edge of the slot is aligned with the arrow 906, the arrow 908, the arrow 910, and/or the arrow 912.

Figure 10:
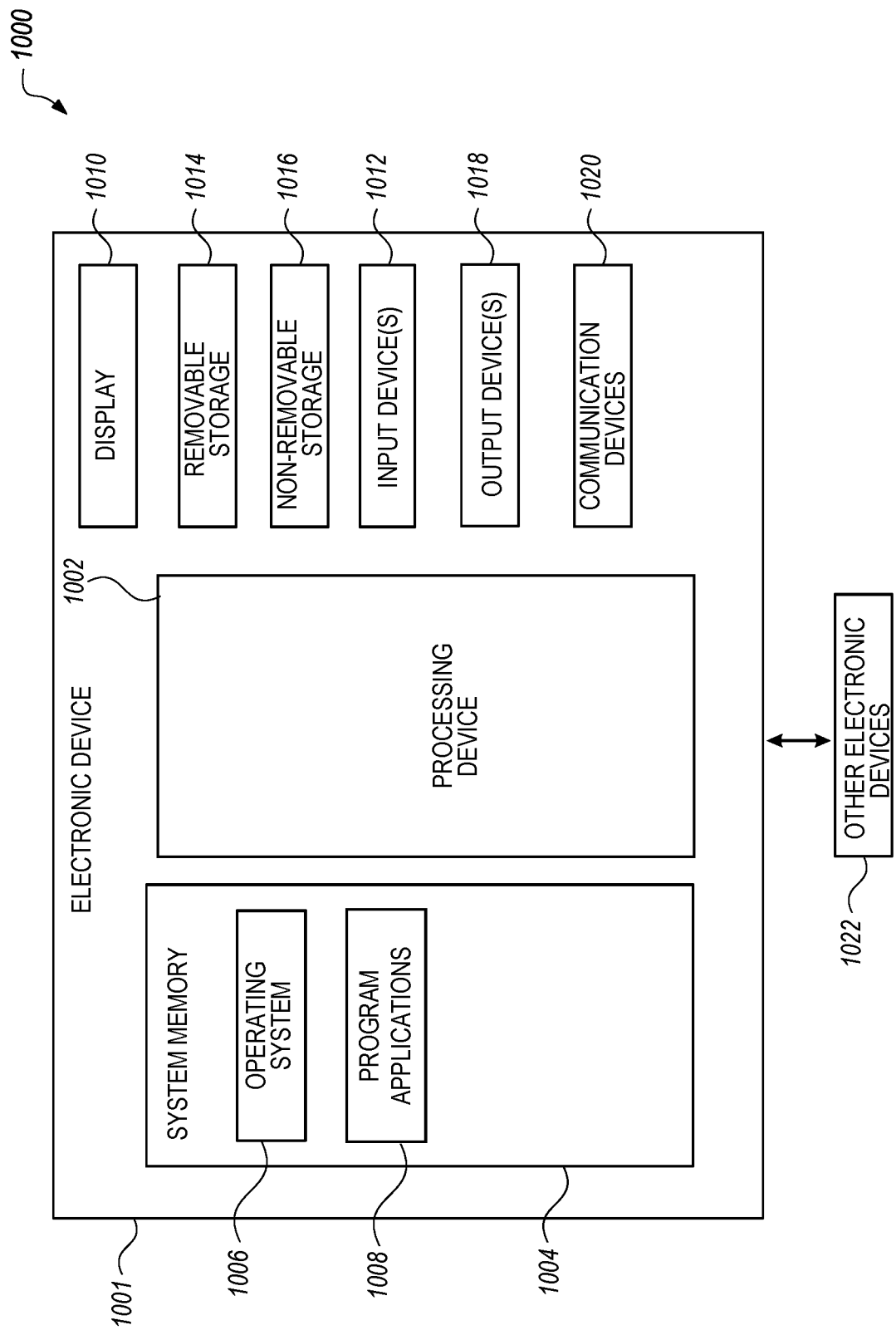
FIG. 10 illustrates a block diagram of an electronic device that may include one or more input structures in accordance with embodiments of the disclosure.

Sensor modules can be included in any type of device that includes an input surface that is operable to receive touch or force inputs. Example devices include, but are not limited to, electronic devices, computing devices (e.g., a laptop computer, a tablet), appliances (e.g., a refrigerator), automobiles (e.g., dashboards, steering wheels), remote controllers (e.g., a TV remote, a game controller), televisions, mobile devices (e.g., a mobile phone), and wearable devices (e.g., a smart watch, a fitness tracker, headphones or headsets). FIG. 10 is a block diagram of an electronic device that may include one or more sensor modules in accordance with embodiments of the disclosure. It should be understood that the example electronic device 1000 is only one example of a device upon which the methods described herein may be implemented. Optionally, the electronic device 1000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media. Some or all of the components in the electronic device 1000 may further be implemented in other types of devices, such as any device that is operable to include one or more sensor modules and at least one input surface.

The example electronic device 1000 includes an enclosure 1001 that houses a processing device 1002 and a memory 1004 (e.g., a storage device). Any suitable processing device 1002 can be used. For example, the processing device 1002 may be a microprocessor, an application specific integrated circuit, a field programmable gate array, or combinations thereof.

Depending on the configuration and type of the electronic device 1000, the memory 1004 may comprise, but is not limited to, volatile storage (e.g., random access memory), non-volatile storage (e.g., read-only memory), flash memory, or any combination of such memories.

The memory 1004 may include a number of program applications and data files, such as an operating system 1006 and one or more program applications 1008. In some instances, at least one program application is operable to receive sensor signals from one or more sensor modules and responsively execute one or more actions. For example, a sensor signal that is received from a sensor module is processed to determine an amount of force that has been applied to an input surface. Additionally, in some instances, the program application is operable to cause an action, or to transmit a signal to another application or component to cause an action to be performed.

The operating system 1006, for example, may be suitable for controlling the operation of the electronic device 1000. Furthermore, embodiments of the disclosure may be practiced in conjunction with a graphics library, other operating systems, or any other application program and is not limited to any particular application or system.

The electronic device 1000 may have additional features or functionality. For example, the electronic device 1000 can include a display 1010 and one or more input devices 1012 that allow a user to enter information into the electronic device 1000. The display 1010 is operable to display a graphical user interface (GUI) of a client or of a developer portal. The input device(s) 1012 can include one or more sensor modules that are associated with at least one input surface as well as buttons, a keyboard, a trackpad, a mouse, a pen, a sound or voice input device, or an audio input (e.g., a microphone jack). The display 1010 may also function as an input device that includes one or more sensor modules (e.g., a touch-sensitive display that accepts touch and/or force inputs).

The electronic device 1000 may also include additional storage devices such as a removable storage device 1014 and a non-removable storage device 1016. The removable storage device 1014 and/or the non-removable storage device 1016 can be configured with the aspects as described herein. The removable storage device 1014 and the non-removable storage device 1016 are operable to store processor-executable instructions that when executed by the processing device 1002, may cause operations to be performed. The memory 1004, the removable storage device 1014, and/or the non-removable storage device 1016 may include RAM, ROM, electrically erasable read-only memory (EEPROM), flash memory or other memory technology, CD-ROM, digital versatile disks (DVD) or other optical storage, magnetic storage devices, or any other article of manufacture which can be used to store information, and which can be accessed by the electronic device 1000. In one embodiment, the storage device does not include a carrier wave or other propagated or modulated data signal.

The electronic device 1000 may include one or more output devices 1018 such as a display (e.g., display 1010), an audio transducer (e.g., a speaker), a visual indicator (e.g., a light emitting diode), a vibration transducer for providing the user with tactile feedback (e.g., haptic feedback), an audio output (e.g., a headphone jack), or a video output (e.g., a HDMI port) for sending signals to or receiving signals from an external device. The aforementioned devices are examples and others may be used.

The electronic device 1000 may also include one or more wired or wireless communication devices 1020 allowing communications with other electronic devices 1022. Examples of suitable communication devices 1020 include, but are not limited to, radio frequency (RF) transmitter, receiver, and/or transceiver circuitry; universal serial bus (USB), parallel, and/or serial ports.

As should be appreciated, FIG. 10 is described for purposes of illustrating example methods and systems and is not intended to limit the disclosure to a particular sequence of steps or a particular combination of hardware or software components. In some instances, some or all of the components in the electronic device may be included in a device that includes one or more sensor modules associated with at least one input surface. For example, an automobile or a refrigerator may include a subset of the components shown in FIG. 10, such as the processing device 1002, the memory 1004, an input device that includes one or more sensor modules that are associated with at least one input surface.

Figure 11:
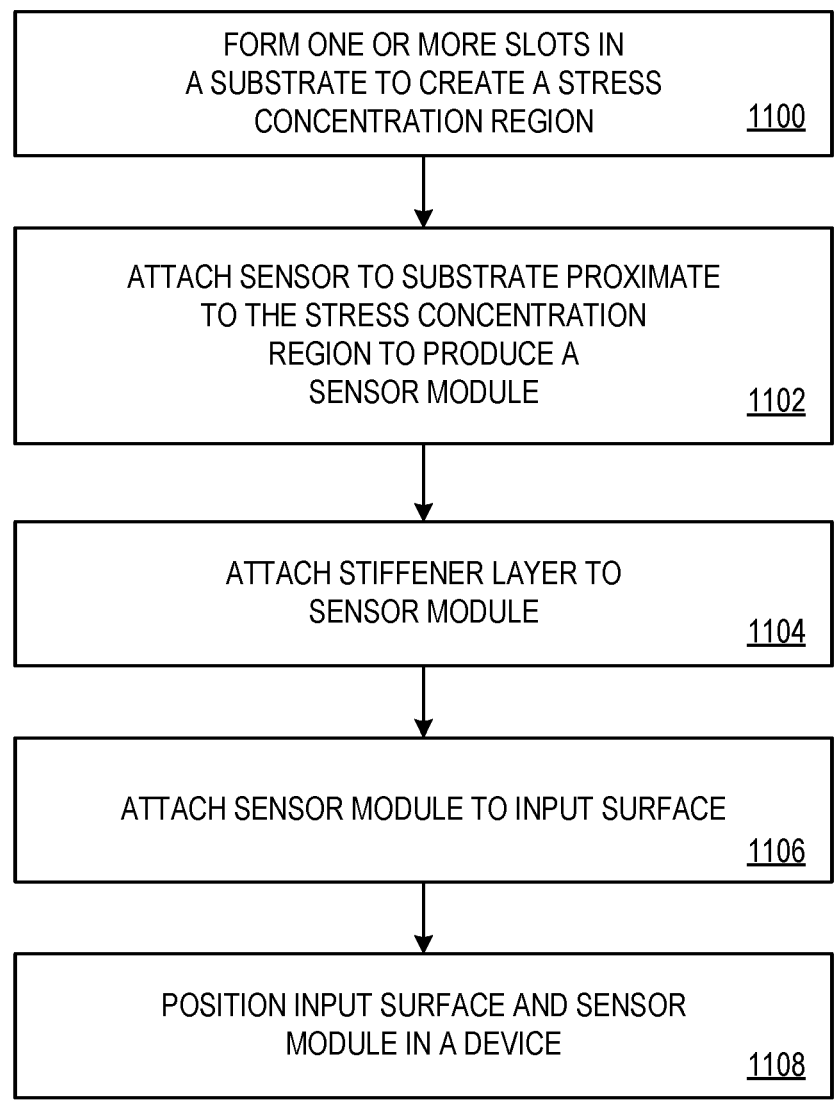
FIG. 11 illustrates an example flowchart of a method of providing an input structure in accordance with embodiments of the disclosure.

FIG. 11 is an example flowchart of a method of providing an input structure in accordance with embodiments of the disclosure. The method is described in conjunction with one sensor module in the input structure. However, the method can be used to form multiple sensor modules in the input structure.

Initially, as shown in block 1100, one or more slots are formed in a substrate to create a stress concentration region. As described earlier, the stress concentration region is operable to concentrate a strain on the substrate in the stress concentration region. Since the stress concentration region is proximate to the sensor, the stress concentration region is operable to concentrate strain proximate to a sensor.

A sensor that is operable to detect strain is operably attached to the substrate proximate to the stress concentration region (block 1102). In certain embodiments, the sensor is operably attached to the substrate proximate to the one or more slots that produce the stress concentration region. The sensor and the substrate form a sensor module.

A stiffener layer is attached to the sensor module at block 1104. In certain embodiments, the stiffener layer is attached to a first surface of the substrate and the sensor module is operably attached to a second surface of the substrate. The second surface of the substrate may be opposite the first surface of the substrate. Block 1104 is optional and may be omitted in other embodiments.

Next, as shown in block 1106, the sensor module is attached to an input surface. In certain embodiments, a first surface of the input surface is operable to receive inputs (e.g., touch or force inputs) and the sensor module is attached to a second surface of the input surface. When a stiffener layer is attached to the sensor module, the stiffener layer may be attached to the second surface of the input surface.

The input surface and the sensor module may then be positioned or included in a device (block 1108). One non-limiting nonexclusive example of a device is an electronic device. Example electronic devices include, but are not limited to, computing devices such as a laptop computer, a tablet, a mobile phone, or a wearable device.

The method shown in FIG. 11 can include additional blocks or omit blocks in other embodiments. Additionally or alternatively, the order of the blocks can be performed in an order that differs from the order depicted in FIG. 11. For example, block 1104 can be performed before block 1102, where the stiffener layer is attached to the substrate before the sensor is attached to the substrate.

Although the slots in the substrates shown in FIGS. 2-7 are depicted as having a rectangular shape, each slot in a substrate can have any shape in other embodiments. Additionally or alternatively, the substrates illustrated in FIGS. 2-8 are shown as having rectangular shapes. In other embodiments, a substrate may have any shape.

The present disclosure contemplates that in implementations with additional sensors, additional slots can be formed on opposite sides of the additional sensor modules. As a non-limiting example, an implementation of the present disclosure including three sensors can include six slots, or an implementation with four sensors can include eight slots and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A sensor module, comprising:
   a substrate;
   a sensor operably attached to the substrate, wherein the sensor is operable to detect a strain on the substrate;
   a first slot formed in the substrate such that first peripheral edges of the first slot are defined by the substrate and the first peripheral edges are bound to a first space defined by the first slot, the first peripheral edges having a first long edge and a first short edge that intersect one another, the first long edge being longer than the first short edge; and
   a second slot formed in the substrate such that second peripheral edges of the second slot are defined by the substrate and the second peripheral edges are bound to a second space defined by the second slot, the second peripheral edges having a second long edge and a second short edge that intersect one another, the second long edge being longer than the second short edge, wherein:
      at least one of the first slot or the second slot is arranged along axis extending through a centerline of the sensor, wherein the axis is arranged such that one of the following is true:
         the axis orthogonally intersects both the first short edge and the second short edge so at to extend through both the first space of the first slot and the second space of the second slot; and
         the axis is a coincident line with at least one peripheral edge of the at least one of the first slot or the second slot, the at least one peripheral edge being at least one of the first peripheral edges and the second peripheral edges; and
      the first slot and the second slot are configured to create a stress concentration region on the substrate to concentrate strain in proximity to the sensor.

2. The sensor module of claim 1, wherein a respective width of each of the first slot and the second slot is less than a width of the sensor.

3. The sensor module of claim 2, wherein the respective width of each of the first slot and the second slot is equal to or less than about one millimeter.

4. The sensor module of claim 1, wherein:
   the first slot and the second slot divide the substrate into a first region, a second region, and a third region;
   the third region connects the first region and the second region; and
   the sensor is on the third region of the substrate.

5. The sensor module of claim 4, wherein the sensor is spaced approximately equally from each of a pair of opposing edges of the third region, the pair of opposing edges of the third region being defined by the first slot and the second slot.

6. The sensor module of claim 4, wherein a width of the third region is about two millimeters.

7. The sensor module of claim 1, wherein the sensor is a chip scale package sensor.

8. The sensor module of claim 1, wherein the substrate is a flexible printed circuit, a printed circuit board, or rigid-flex circuit board.

9. The sensor module of claim 1, further comprising a stiffener layer attached to the substrate.

10. An input structure, comprising:
    an input surface; and
    a sensor module operably attached to the input surface, the sensor module comprising:
       a substrate;
       a first slot in the substrate such that first peripheral edges of the first slot are defined by the substrate and the first peripheral edges are bound to a first space defined by the first slot, the first peripheral edges having a first long edge and a first short edge that intersect one another, the first long edge being longer than the first short edge, and a second slot in the substrate such that second peripheral edges of the second slot are defined by the substrate an the second peripheral edges are bound to a second space defined by the second slot, the second peripheral edges having a second long edge and a second short edge that intersect one another, the second long edge being longer than the second short edge, the first slot and the second slot configured to produce a stress concentration region; and a sensor on the substrate proximate to the stress concentration region, wherein:

at least one of the first slot or the second slot is arranged along an axis that extends through the sensor, wherein the axis is arranged such that one of the following is true:

the axis orthogonally intersects both the first shorty edge and the second edge so as to extend through both the first space of the first slot and the second space of the second slot; and the axis is a coincident line with at least one peripheral edge of the at least one of the first slot or the second slot, the at least one peripheral edge being at least one of the first peripheral edges and the second peripheral edges; and the sensor is operable to detect a strain on the substrate; and the stress concentration region is operable to concentrate strain on the substrate proximate to the sensor.

11. The input structure of claim 10, wherein:
the sensor is a first sensor;
the stress concentration region is a first stress concentration region; and
the input structure further comprises:
a third slot and a fourth slot in the substrate to produce a second stress concentration region; and
a second sensor on the substrate proximate to the second stress concentration region, wherein:
the second sensor is operable to detect a second strain on the substrate; and
the second stress concentration region is operable to concentrate the second strain on the substrate proximate to the second sensor.

12. The input structure of claim 11, wherein at least one of the first sensor or the second sensor is a chip scale package sensor.

13. The input structure of claim 10, wherein the sensor is at least partially on each of the first portion and a second portion of the substrate.

14. The input structure of claim 10, wherein:
the first slot and the second slot define a first portion of the substrate and a second portion of the substrate;
a centerline of the sensor is aligned with a boundary between the first portion and the second portion of the substrate; and
the first portion of the substrate and the second portion of the substrate are configured to create the stress concentration region on the substrate.

15. The input structure of claim 10, further comprising a stiffener layer attached to the substrate.

16. A method of providing an input structure, the method comprising:
forming slots in a substrate to create a stress concentration region on the substrate, the slots comprising a first slot and a second slot, wherein:
the first slot is formed in the substrate such that first peripheral edges of the first slot are defined by the substrate and the first peripheral edges are bound to a first space defined by the first slot, the first peripheral edges having a first long edge and a first short edge that intersect one another, the first long edge being longer than the first short edge; and
the second slot is formed in the substrate such that second peripheral edges of the second slot are defined by the substrate and the second peripheral edges are bound to a second space defined by the second slot, the second peripheral edges having a second long edge and a second short edge that intersect one another, the second long edge being longer than the second short edge;
attaching a sensor to the substrate in proximity to the stress concentration region, wherein at least one of the slots is arranged along an axis that extends through the sensor, wherein the axis is arranged such that one of the following is true:
the axis orthogonally intersects both the first short edge and the second short edge so as to extend through both the first spaces of the first slot and the second space of the second slot; and
the axis is a coincident line with at least one peripheral edge of at least one of the first slot and the second slot, the at least one peripheral edge being at least one of the first peripheral edges and the second peripheral edges; and
attaching the substrate to an input surface, wherein a stress on the input surface produces a strain on the substrate and the stress concentration region is operable to concentrate strain in proximity to the sensor.

17. The method of claim 16, further comprising attaching a stiffener layer to the substrate prior to attaching the substrate to the input surface.

18. The method of claim 16, wherein a centerline of the sensor is aligned with an end of one of the first slot or the second slot.

19. The method of claim 16, wherein a width of the sensor is less than a width of the first slot or a width of the second slot.

20. The method of claim 16, wherein the sensor is spaced approximately equally from the first slot and the second slot.

* * * * *

UNITED STATES PATENT AND TRADEMARK OFFICE
CERTIFICATE OF CORRECTION

PATENT NO. : 12,422,314 B2
APPLICATION NO. : 17/959821
DATED : September 23, 2025
INVENTOR(S) : Bryan Low, Julius Minglin Tsai and Ali Foughi Page 1 of 1

It is certified that error appears in the above-identified patent and that said Letters Patent is hereby corrected as shown below:

In the Claims

In Column 16, in Claim 1, at Line 23, change "so at to extend" to read --so as to extend--

In Column 17, in Claim 10, at Line 6, change "the substrate an" to read --the substrate and--

In Column 17, in Claim 10, at Line 22, change "shorty edge and the second edge" to read --short edge and the second short edge--

In Column 18, in Claim 16, at Line 8, change "A method of providing" to read --A method of assembling--

In Column 18, in Claim 16, at Line 35, change "both the first spaces" to read --both the first space--

In Column 18, in Claim 16, at Line 45, change "concentrate strain" to read --concentrate the strain--

Signed and Sealed this
Eleventh Day of November, 2025

John A. Squires
*Director of the United States Patent and Trademark Office*